Oct. 30, 1962   J. DAUM   3,060,817
MASS STRUCTURES COMPRISING JOINT-FILLING MEANS
Filed Feb. 27, 1959
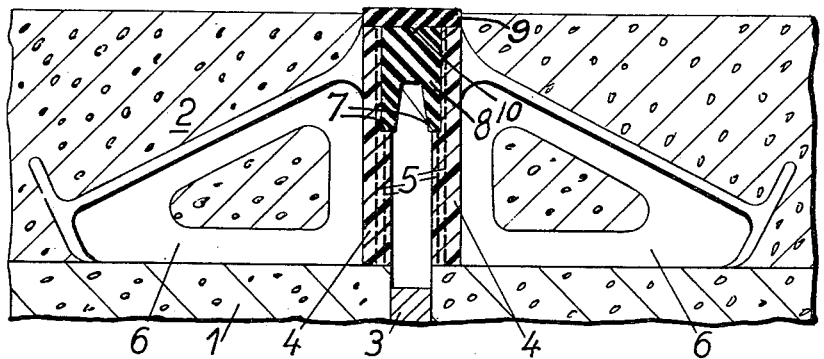
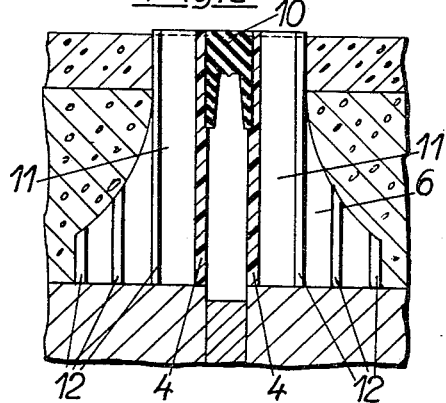
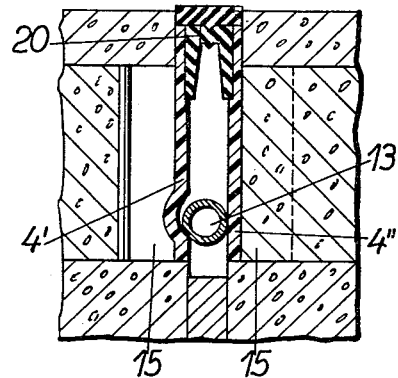
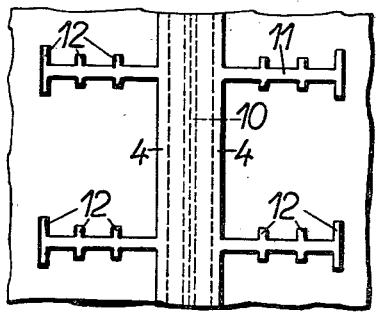
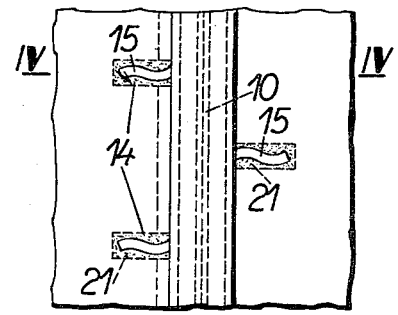

United States Patent Office 3,060,817
Patented Oct. 30, 1962

3,060,817
MASS STRUCTURES COMPRISING JOINT-FILLING MEANS
Josef Daum, Mommsengasse 6, Vienna IV, Austria
Filed Feb. 27, 1959, Ser. No. 796,132
Claims priority, application Austria Mar. 12, 1958
6 Claims. (Cl. 94—18)

This invention relates to joint-filling means in mass structures such as road coverings, runways, linings of basins or the like, which structures consist of sections made from concrete or bitumen-containing mixtures, which sections may be prefabricated and when assembled to form the mass structure are separated by joints. These joints must be filled to prevent a penetration of water or other substances into the structure. The filling of such joints with mixtures of bitumen, tar, cold-moldable asphalt compounds or the like, with additions of stabilizers, or with puttylike compositions, is not entirely satisfactory because all these joint-filling materials have the undesired property of embrittling after some time, separating from the walls of the joints and either to crumble out of the joint or, if they are soft enough, to emerge over its top. If the joint-filling means is not flush with the adjoining surface of the mass structure, shocks and vibration will be caused by vehicles traversing the joint, whereby the safety of the road will be highly impaired. Continual maintenance of such joints is necessary and involves continual expenses. In order to avoid these disadvantages it has been proposed to insert or force a resilient joint-filling body into the joint so that this body engages the smooth walls of the joint. According to another proposal, recesses are to be formed in the walls defining the joint and a hose-like rubber body is to be forced into these recesses whereas the free space up to the top of the joint is to be filled with any of the known filling compositions. These joint-filling means have the disadvantage that the walls of the joint must be made first and the filling means must be introduced into the finished joint, which must have a definite shape, so that a firm and durable connection between the walls defining the joint and the filler is not ensured. Besides, it has proved necessary to fill the relatively deep space which remains free near the surface of the mass structure with one of the known filler compositions, which have the above-mentioned disadvantages. These disadvantages remain in existence if sealing copper sheets extending into the mass structure or rubber seals similar thereto are used because in these cases the joint space which remains free is of substantial depth and must be filled with the known fillers.

The proposed joint-filling means avoids these disadvantages. It comprises a joint-filling member which consists according to the invention of two rigid cheeks which extend throughout the length of the joint and are adapted each to be sealed to one of the walls defining the joint, and at lease one resiliently deformable bridge, which is tightly connected to the rigid cheeks.

Additional features of the invention will become apparent from a detailed explanation of illustrative embodiments of the invention shown in the accompanying drawing, in which FIG. 1 is a longitudinal sectional view showing a road body adjacent to an expansion joint provided with joint-filling means according to the invention. FIGS. 2 and 3 are a sectional view and a top plan view, respectively, showing another embodiment of the joint-filling means, and FIGS. 4 and 5 are a sectional view taken on line IV—IV of FIG. 5 and a top plan view, respectively, showing a third embodiment of such joint-filling means.

The joint-filling means according to the invention is suitable for application to expansion joints, compression joints or apparent joints. It may extend throughout the thickness of the mass structure or preferably only through the thickness of the top covering thereof and may be installed in the joints either during or after the formation of the structure and joints.

The road covering shown in FIG. 1 comprises a base 1 and a topping 2, both of which may consist, e.g., of concrete of suitable quality. The joint in the base concrete is filled with a joint-filling board 3, which is inserted during the construction and rots in the course of time. The joint-filling means according to the invention is restricted to the concrete topping and comprises two rigid cheeks 4, which consist of a plastic, such as polyvinylchloride, and are provided with special stiffening inserts 5. Such inserts of textile and/or wire fabric are recommendable if the inherent stiffness of the plastic, which depends on its type, composition and heat treatment is not sufficient. Bracket-shaped anchoring members 6 are arranged on the outside of the substantially parallel walls of the cheeks and may be staggered. The anchoring members 6 may be integral with the cheeks. These anchoring members are embedded in the concrete topping and provide a reliable connection thereof to the cheeks. Each of the inside surfaces of the cheeks has a step 7. Near the road surface, the space between the two cheeks is larger by the width of the steps than in the remainder of the joint and is filled by a bridge 8, which consists of a resiliently deformable material such as rubber or polyvinylchloride. This bridge may either be connected to the two cheeks to form a unit ready for placing or may be constructed itself of two resilient half-sections, each of which is connected to one of the cheeks; these half-sections are connected to each other by vulcanizing or heat-sealing when the joint-filling means is being installed as is indicated at 20 in FIG. 4. The cross-sectional shape of the bridge may be selected, preferably in the form of an M, to cause the bridge material to camber above the road surface in response to a constriction of the joint. The top edges of the cheeks may be flush with the road surface or, as shown in FIG. 1, may be somewhat spaced below the same. This may be necessary for construction reasons particularly where joint-filling means according to the invention are being installed into the joints of existing structures but may also be advisable during the erection of the structure. The shallow groove which is then left free above the bridge and the top faces of the cheeks is filled with a tightly applied vulcanized or heat-sealed bridge covering 9 consisting of an oil-resisting material, such as a suitable rubber, which is formed with a longitudinal groove 10 to prevent it from cambering. The surface of the bridge covering or, where no bridge covering is provided, of the bridge can simply be cut flush with the road surface and may then be formed with the longitudinal groove.

It may also be recommendable to cause the cheeks as well as the bridge to protrude to some extent—about a few millimeters—over the prescribed level of the top surface of the structure during the erection thereof, as is indictated in FIG. 2, and to cut the protruding parts on the top surface level of the structure after the same has hardened, followed by the formation of the longitudinal groove.

Before the joint-filling means is installed in the location of the joint, a steel rail is introduced into the space between the cheeks which is not filled by the bridge. This rail is pulled out laterally after the joint-filling means has been installed. Joint-filling members connected to form a unit ready for placing may also be used if the mass structure is erected only on one side first. In this case one cheek with its anchoring members and the rail are inserted first whereas the outside of the other cheek engages the formwork, which is provided with openings for the anchoring members.

Instead of being bracket-shaped the anchoring members may have different forms provided that they ensure a good connection of the structure to the cheeks. FIGS. 2 and 3 show a joint filled with a joint-filling means the cheeks 4 of which have anchoring members 6 which are formed as ribs 11 protruding from the outside surfaces of the cheeks and formed with cross-ribs 12. FIGS. 4 and 5 show a joint-filling means which is particularly suitable for installation in existing structures. These joints may be cut to the necessary width if required and are provided with lateral openings 14 in the structure at regular intervals. The joint-filling member comprises again two cheeks, one of which, 4', has an offset for receiving e.g., a pipe 13 which is to extend across the road along the joint. The other cheek, 4'', has substantially flat boundary surfaces. The anchoring members have the shape of ribs 15 of, e.g., S-shaped cross-section, which extend throughout the width of the cheeks and are spaced like the recesses. Such joint-filling means having cheeks of different cross-sectional shapes are preferably separately installed, the ribs being inserted into the recesses and being connected to the structure by the introduction of a suitable binder such as a motar on a polyvinyl chloride basis. The two bridge parts, each of which is connected to one of the cheeks, have also different cross-sectional shape (see FIG. 4 in which the assembled shape is that of an M, the bridge parts being connected along line 20). After installation, the bridge parts are heat-sealed to each other, by any suitable manner, dependent on the material used, in a fashion well known to a man skilled in the art. As an example, if the bridge parts are constituted by polyvinylchloride, the application of heat effects a welding and a uniting by heat sealing. Thereafter, the united bridge parts are cut to shape and provided with a longitudinal groove of semi-circular or triangular cross-section.

The joints of the structure need not be defined by substantially parallel, flat walls, These walls may also have curved surfaces, e.g., when one of the walls to be installed or both have offsets. Alternatively, the walls may diverge or converge toward the top in a joint having a substantially constant width on any given level throughout its extent. In special cases it may be recommendable to vary also the width of the joint along the length thereof. The adaptation of the joint-filling means according to the invention to the existing conditions insolves no difficulty because even a joint-filling member forming a unit ready for placing will permit of a relative displacement of the two cheeks within certain limits owing to the resiliency of the bridge.

In making mass structures of the type described from prefabricated parts it is recommendable to provide the slab-shaped parts during their manufacture with a cheek and the associated bridge part on those surafces which are to define joints.

It may be mentioned that the provision of anchoring means on the cheeks is not essential. In structures under a small or uniform compressive stress, such as the sealing strips of water basins, it may be quite sufficient to form the cheeks as strips having substantially flat surfaces, which are sealed to the walls defining the joints with the aid of a cement such as a binder on a polyvinyl chloride basis, as is indicated at 21 in FIGS. 4 and 5.

The joint-filling means according to the invention leaves the space between the cheeks which is not filled by the bridge or bridge covering entirely free, so that a satisfactory, unhindered relative movement of the several parts of the mass structure which are separated by joints is enabled.

The invention is not restricted to the embodiments shown and described for purposes of illustration only. Specifically, the method of prefabricating the joint-filling means in sections and assembling these sections in the joint space is not restricted to the half-units described hereinbefore because the joint-filling means may be assembled from prefabricated sections each of which extends only over part of the length and/or width of the joint provided that they are effectively sealed together. The provision of stiffening inserts in the cheeks enables the formation of the body of the cheek from resilient material integrally with the bridge portion adjoining the same.

I claim:

1. In a mass concrete structure resting on a support and having substantially parallel spaced surfaces defining a joint space, the provision of joint filling means in said joint space, the joint filling means comprising two cheeks, each being in sealing engagement with the concrete structure at one of said surfaces, a resilient bridge portion coupled to each of said cheeks and spanning the joint space at the upper portion thereof, said bridge portion including legs and an element supported on said legs arranged in substantially M-shaped fashion, said element of the bridge portion being substantially thicker than the cheeks, the cheeks and bridge portion forming a substantially inverted U-shaped cross section, and anchoring means extending outwardly from said cheeks in a plane substantially normal to said cheeks, said anchoring means extending over the full height of the cheeks and being rigidly connected thereto for maintaining said cheeks in vertical position and for providing a tight seal between said cheeks and said structure, said anchoring means resting on said support, said anchoring means, cheeks and bridge portion constituting an integral unit.

2. Joint filling means as claimed in claim 1 wherein said anchoring means comprises triangular shaped flat portions having one surface extending over the full height of the cheeks and fins protruding from said flat portions to engage the mass structure.

3. Joint filling means as claimed in claim 1 in which said thick element of the bridge portion has a top face provided with a recess, the latter said element having an underside, and a ridge on said underside, said recess and ridge being triangular and identical in cross-section to ensure that the top face will remain substantially flat with said bridge portion compressed in a horizontal direction.

4. Joint filling means as claimed in claim 1 wherein said cheks, anchoring means, and bridge portion are each constituted of polyvinylchloride to constitute an integral one pice unit.

5. Joint filling means as claimed in claim 1 comprising a resilient bridge covering on top of said bridge portion, said bridge portion and cheeks being spaced below the top of said structure, said bridge covering protruding above the top of said structure.

6. A method of filling a space between opposite internal surfaces in a mass structure, the method comprising fixing a flexible member on each of a pair of rigid cheek members, connecting each of said rigid cheek members to one of the internal surfaces in sealing relation and with the flexible members extending towards one another in said space, the flexible members being located on said cheeks at the upper edges thereof so that with said cheeks connected to said internal surfaces said flexible members extend in the upper portion of said space and provide accessibility thereto from above said structure, engaging the flexible members together and welding the same together in situ to form an integral elastic body which is integral with said cheeks.

References Cited in the file of this patent

UNITED STATES PATENTS

| | | |
|---|---|---|
| 1,586,326 | Older | May 25, 1926 |
| 1,769,828 | Fischer | July 1, 1930 |
| 1,885,391 | Thompson et al. | Nov. 1, 1932 |
| 1,965,403 | Alvey | July 3, 1934 |
| 2,138,817 | Jacobson | Dec. 6, 1938 |
| 2,198,084 | Jacobson | Apr. 23, 1940 |
| 2,230,303 | Leguillon | Feb. 4, 1941 |
| 2,315,588 | Brickman | Apr. 6, 1943 |
| 2,358,328 | Heltzel | Sept. 19, 1944 |
| 2,370,647 | Fischer | Mar. 6, 1945 |
| 2,575,247 | Carter | Nov. 13, 1951 |
| 2,577,998 | Carter | Dec. 11, 1951 |
| 2,619,884 | Jacobson | Dec. 2, 1952 |
| 2,700,329 | Carter | Jan. 25, 1955 |
| 2,834,198 | Goodman | May 13, 1958 |

OTHER REFERENCES

Engineering News-Record, Apr. 10, 1958, page 51.